United States Patent
Xu et al.

(10) Patent No.: US 12,452,535 B2
(45) Date of Patent: Oct. 21, 2025

(54) LENS DRIVE APPARATUS

(71) Applicant: Changzhou AAC Raytech Optronics Co., Ltd., Jiangsu (CN)

(72) Inventors: Tongming Xu, Changzhou (CN); Suohe Wei, Changzhou (CN); Limei Zhao, Changzhou (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 257 days.

(21) Appl. No.: 18/327,035

(22) Filed: May 31, 2023

(65) Prior Publication Data
US 2024/0171861 A1    May 23, 2024

Related U.S. Application Data

(63) Continuation of application No. PCT/CN2023/086004, filed on Apr. 3, 2023.

(30) Foreign Application Priority Data

Nov. 23, 2022 (CN) .......................... 202223125233.3

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC ............................ H04N 23/687; H04N 23/54
See application file for complete search history.

(56) References Cited

U.S. PATENT DOCUMENTS

2023/0168464 A1*  6/2023  Xie ..................... G02B 7/08
                                                359/819

* cited by examiner

*Primary Examiner* — Lin Ye
*Assistant Examiner* — Fayez A Bhuiyan
(74) *Attorney, Agent, or Firm* — Wiersch Law Group (57) ABSTRACT

Provided is a lens drive apparatus having fewer components with ensuring auto focusing and anti-shake performance. The apparatus includes a base, a housing, a support frame, a lens barrel, an anti-shake drive assembly, a magnetic circuit assembly, and a focusing drive assembly. The support frame includes two opposite first enclosing walls and two opposite second enclosing walls. The magnetic circuit assembly includes a first magnetic group and a weight respectively fixed to the first enclosing walls, and two second magnetic groups respectively fixed to the two second enclosing walls. The anti-shake drive assembly includes three anti-shake coils fixed to the base and respectively spaced apart from the first and second magnetic groups. The focusing drive assembly includes two drive coils fixed to an outer side of the lens barrel and respectively spaced apart from inner sides of the two second magnetic groups.

8 Claims, 6 Drawing Sheets

LENS DRIVE APPARATUS

TECHNICAL FIELD

The present disclosure belongs to the technical field of lenses, and in particular, to a lens drive apparatus.

BACKGROUND

With the development of camera technologies, a lens drive apparatus is widely used in various camera apparatuses. Combination of the lens drive apparatuses and various portable electronic devices such as mobile phones, cameras, and computers is favored by consumers.

In the related art, a drive mechanism of a lens drive apparatus is generally formed by assembling a coil and a magnet, to realize auto focusing (AF) and/or optical image stabilization (OIS). A drive coil, an anti-shake coil, and a magnet are respectively fixed to a base, a housing, and a lens barrel. The lens barrel is supported on the housing through an elastic piece. When a current is applied to the drive coil or the anti-shake coil, the coil generates an electromagnetic field to drive the magnet to move, thereby driving the lens barrel to move accordingly to realize AF or OIS.

However, the drive coil, the anti-shake coil, and the magnet in the related art are all required to be arranged around the optical axis, requiring many and complicated components and excessively high costs.

SUMMARY

A lens drive apparatus with simplify components and reduced costs with ensuring driving and anti-shake performance is provided.

The lens drive apparatus includes a base, a housing fixed to the base to form a receiving cavity, a support frame supported on a top side of the base and accommodated in the receiving cavity, a lens barrel elastically connected in the support frame, an anti-shake drive assembly arranged on the base, a magnetic circuit assembly arranged on the support frame, and a focusing drive assembly arranged on the lens barrel. The support frame includes two opposite and parallel first enclosing walls and two opposite and parallel second enclosing walls, and an extension direction of the first enclosing walls and an extension direction of the second enclosing walls are perpendicular to each other. The magnetic circuit assembly includes a first magnetic group fixed to one of the first enclosing walls, a weight fixed to the other of the first enclosing walls, and two second magnetic groups respectively fixed to the two second enclosing walls. The anti-shake drive assembly includes three anti-shake coils fixed to the base and respectively spaced apart from the first magnetic group and the two second magnetic groups. The focusing drive assembly includes two drive coils fixed to an outer side of the lens barrel and respectively spaced apart from inner sides of the two second magnetic groups.

As an improvement, the first magnetic group includes a first magnet, an N pole of the first magnet facing an inner side of the support frame, and the two second magnetic groups each includes a second magnet and a third magnet fixedly stacked in a direction of an optical axis, an N pole of the second magnet facing the inner side of the support frame, and an S pole of the third magnet facing the inner side of the support frame.

As an improvement, the magnetic circuit assembly further includes a magnetically conductive ring embedded in the support frame and surrounding an outer side of the lens barrel, and the first magnet, the second magnet, and the third magnet all at least partially overlap with the magnetically conductive ring in a radial direction.

As an improvement, the second magnet and the third magnet of a same second magnetic group are integrally fixedly adhered.

As an improvement, an inner side of each of the two first enclosing walls is provided with a first slot, and an inner side of each of the two second enclosing walls is provided with a second slot, the first slot extending across the first enclosing wall at a side of the support frame close to the base, the second slot extending across the second enclosing wall at the side of the support frame close to the base, the first magnetic group and the weight are respectively embedded in the two first slots of the two first enclosing walls, and the second magnetic groups are respectively embedded in the two second slots of the two second enclosing walls.

As an improvement, corner positions on the top side of the base are provided with corner stoppers, adjacent corner stoppers are provided with a gap therebetween, first winding blocks are arranged in the gaps corresponding to the three anti-shake coils, and each anti-shake coil has a hollow central section and sleeves the corresponding first winding block, and in the direction of the optical axis, a height of each of the corner stoppers and a height of each of the first winding blocks are both greater than a height of each of the three anti-shake coils.

As an improvement, the lens drive apparatus further includes an insert embedded in the base, and each of the anti-shake coils is connected to the insert by spot welding.

As an improvement, the lens drive apparatus further includes an elastic connecting sheet with two ends respectively fixed to the support frame and the lens barrel; a first damping member arranged between a corner position on an outer side of the lens barrel and a corresponding corner position on an inner side of the support frame; and a second damping member arranged between a corner position on the top side of the base and a corresponding corner position on a bottom side of the support frame.

As an improvement, the outer side of the lens barrel is provided with a first glue groove, the inner side of the support frame is provided with a second glue groove whose extension direction is parallel to an optical axis, and the first damping member is fixedly assembled in the first glue groove and slidably assembled in the second glue groove.

As an improvement, outer sides of the lens barrel facing the two second magnetic groups are each provided with a second winding block protruding the corresponding outer side, and each of the drive coils sleeves the corresponding second winding block, a side of the lens barrel facing the first magnetic group is provided with a wire groove, and the two drive coils are connected by a lead wire embedded in the wire groove.

Beneficial effects of the present disclosure are as follows. The lens barrel is configured to fix a lens assembly (not shown) and is elastically connected in the support frame, so the lens barrel can move with the support frame and can move relative to the support frame. In the support frame, only one first enclosing wall is provided with a first magnetic group, and two second enclosing walls are respectively provided with a second magnetic group. Therefore, only three sides of the support frame are provided with magnetic groups. The weight is arranged on the other first enclosing wall, so as to ensure overall mass balance of the support frame. The anti-shake coil arranged on the base and corresponding to the first magnetic group is configured to drive the first magnetic group to drive the support frame to move in a first direction (Y-axis direction), and the anti-shake coils corresponding to the two second magnetic groups are configured to drive the second magnetic groups to drive the support frame to move in a second direction (X-axis direction), so as to realize OIS. The two drive coils arranged on the outer side of the lens barrel and respectively spaced apart from the inner sides of the two second magnetic groups are configured to drive the lens barrel to move in a direction of an optical axis (Z axis), so as to realize AF. The magnetic groups are arranged only on three sides, only three anti-shake coils are arranged, and only two drive coils are arranged, which reduces components of the lens drive apparatus, and can ensure AF and anti-shake performance and save costs.

DESCRIPTION OF EMBODIMENTS

The present disclosure is further described below with reference to the accompanying drawings and embodiments.

Figure 1:
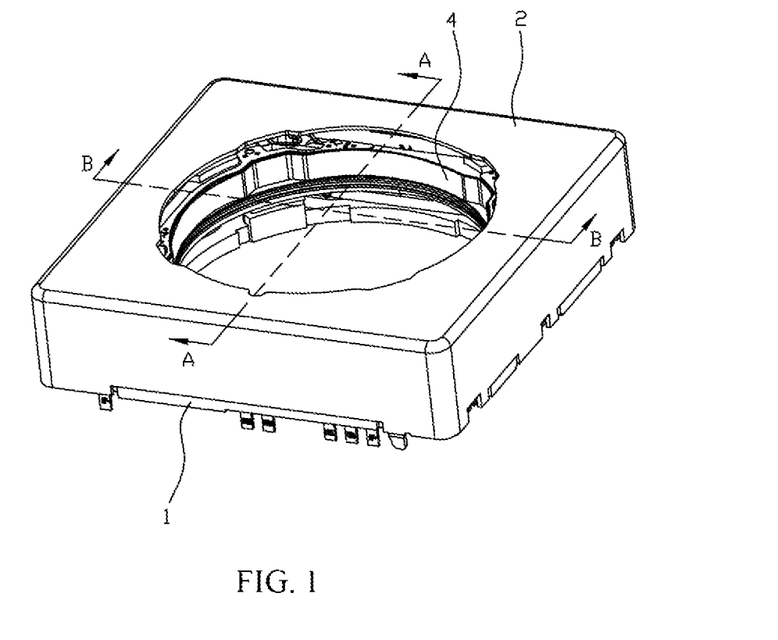
FIG. 1 is a schematic diagram of an overall structure of a lens drive apparatus according to the present disclosure.
Figure 2:
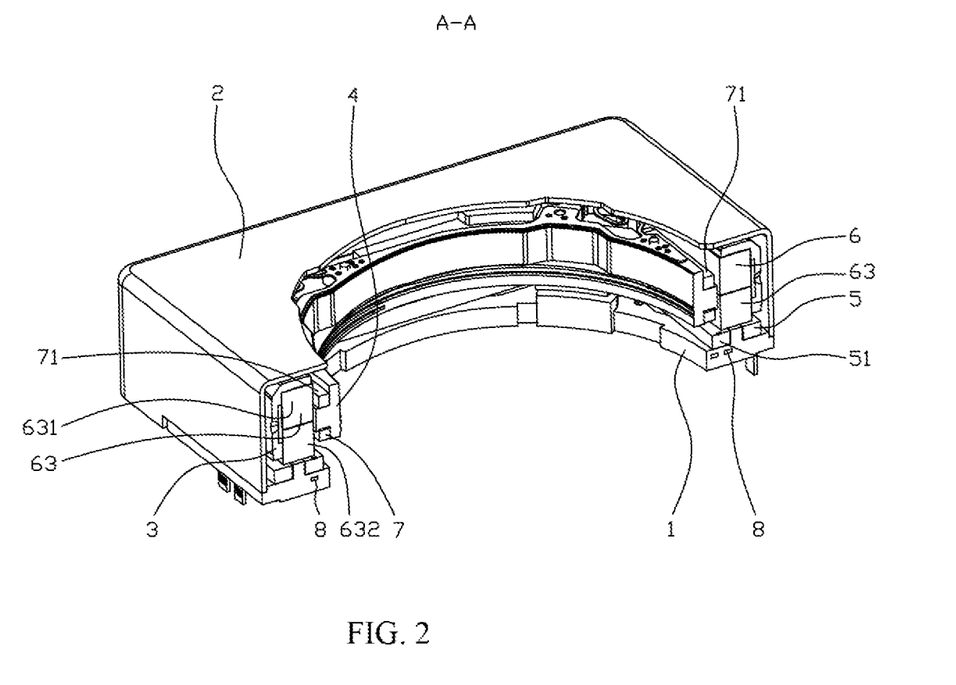
FIG. 2 is a section view of the lens drive apparatus according to the present disclosure taken along line A-A in FIG. 1.
Figure 3:
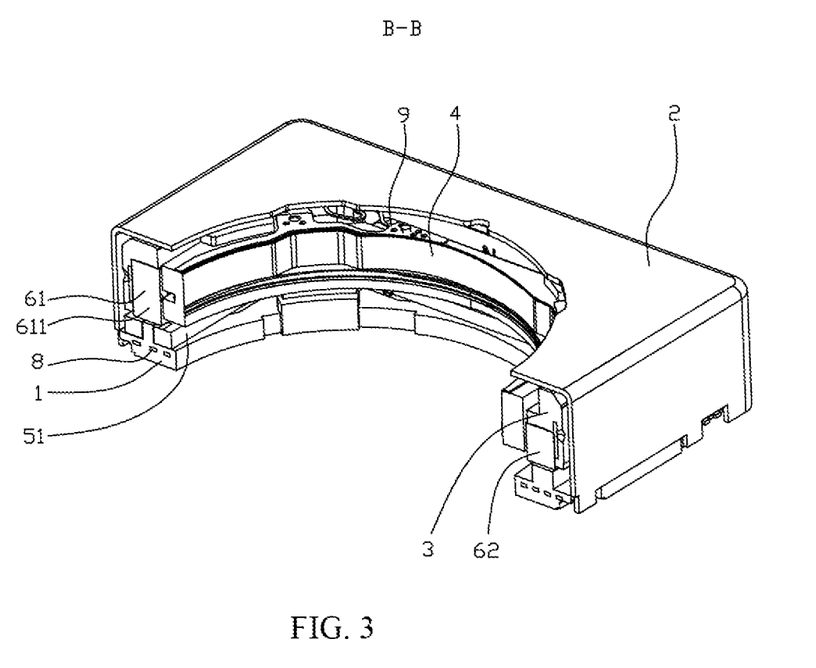
FIG. 3 is a sectional view of the lens drive apparatus according to the present disclosure taken along a line B-B in FIG. 1.
Figure 4:
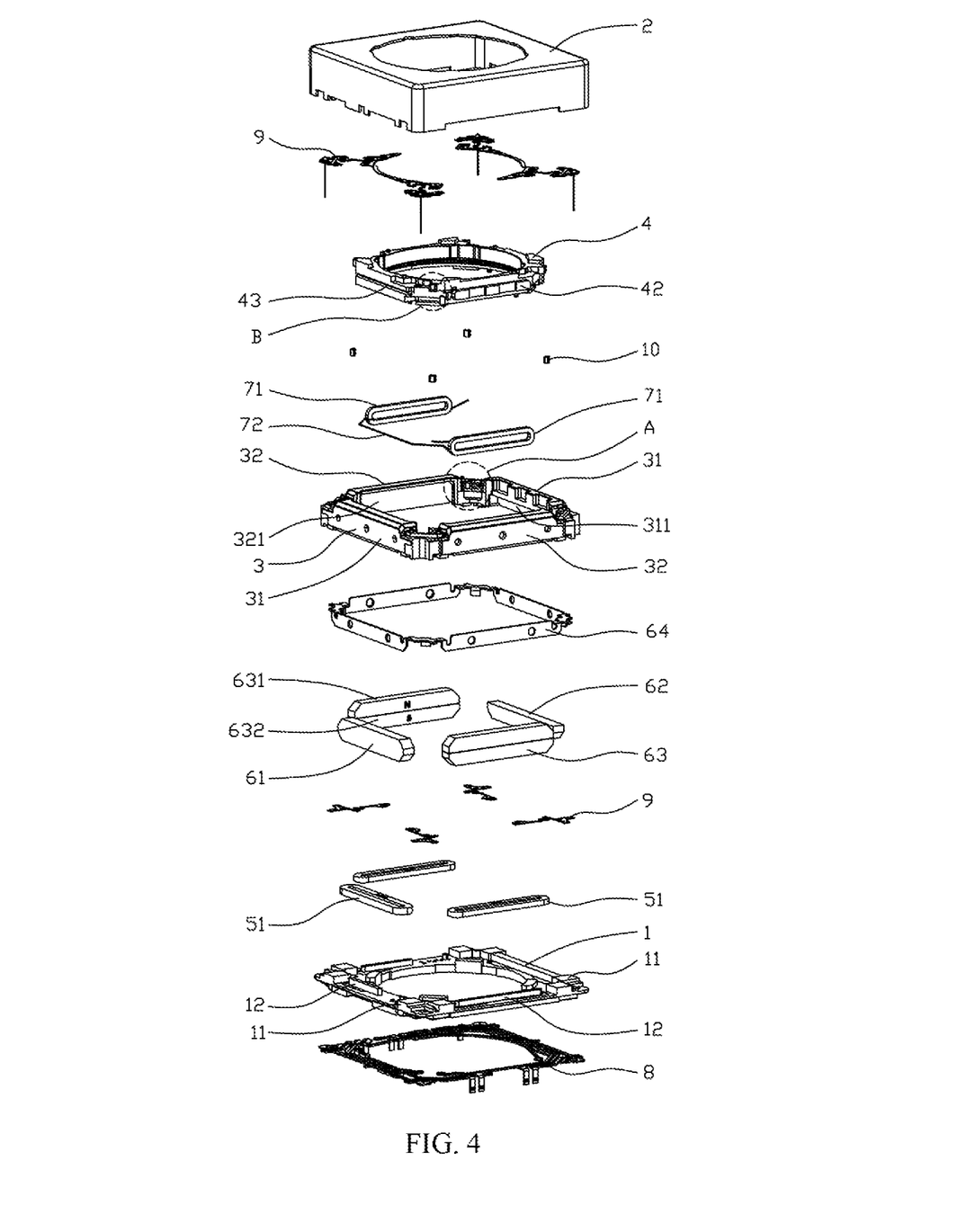
FIG. 4 is a exploded perspective view of the lens drive apparatus according to the present disclosure.
Figure 5:
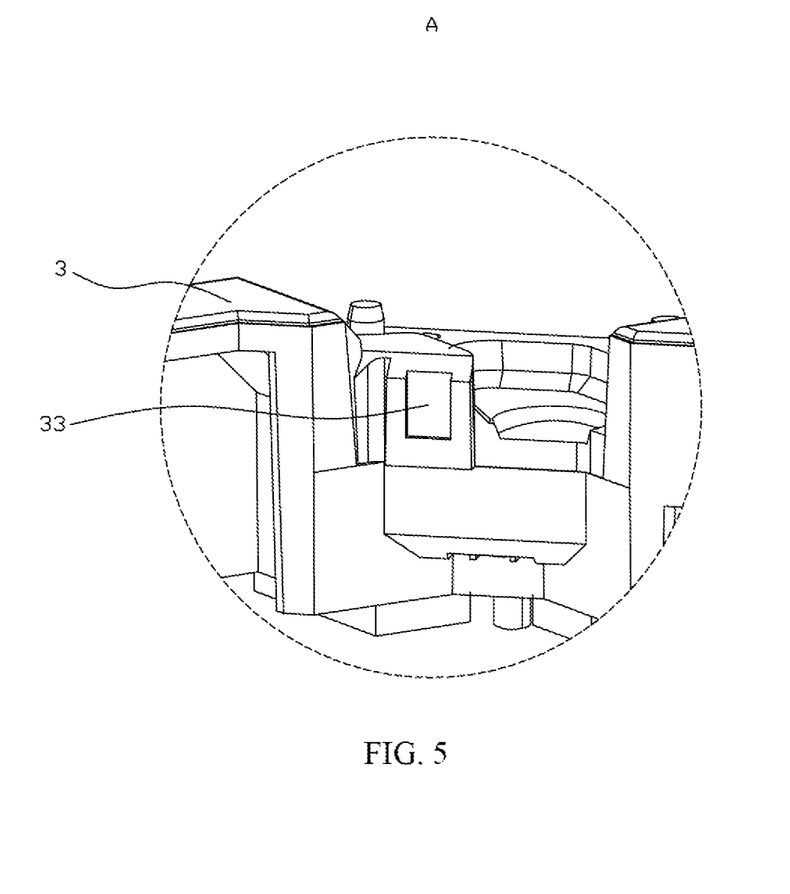
FIG. 5 is an enlarged view of Part A in FIG. 4.
Figure 6:
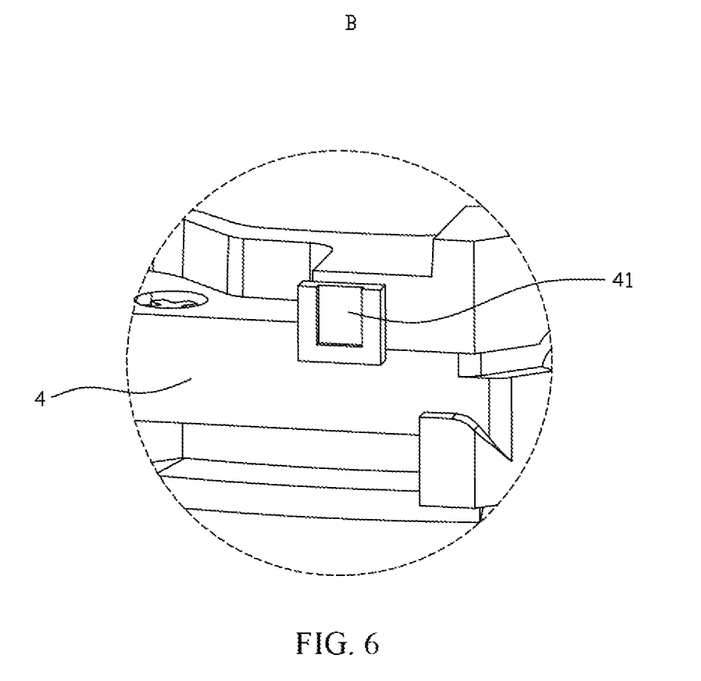
FIG. 6 is an enlarged view of Part B in FIG. 4.

A lens drive apparatus is provided. Referring to FIG. 1 to FIG. 6, the lens drive apparatus includes: a base 1, a housing 2 fixed to the base 1 to form a receiving cavity, a support frame 3 supported on a top side of the base 1 and accommodated in the receiving cavity, a lens barrel 4 elastically connected in the support frame 3, an anti-shake drive assembly 5 arranged on the base 1, a magnetic circuit assembly 6 arranged on the support frame 3, and a focusing drive assembly 7 arranged on the lens barrel 4. The support frame 3 includes two opposite and parallel first enclosing walls 31 and two opposite and parallel second enclosing walls 32. An extension direction of the first enclosing walls 31 and an extension direction of the second enclosing walls 32 are perpendicular to each other. The magnetic circuit assembly 6 includes a first magnetic group 61 fixed to one of the first enclosing walls 31, a weight 62 fixed to the other of the first enclosing walls, and two second magnetic groups 63 respectively fixed to the two second enclosing walls 32. The anti-shake drive assembly 5 includes three anti-shake coils 51 fixed to the base 1 and respectively spaced apart from the first magnetic group 61 and the two second magnetic groups 63. The focusing drive assembly 7 includes two drive coils 71 fixed to an outer side of the lens barrel 4 and respectively spaced apart from inner sides of the two second magnetic groups 63.

The lens barrel 4 is configured to fix a lens assembly (not shown). The lens barrel 4 is elastically connected in the support frame 3, so the lens barrel 4 can move along with the support frame 3 and can move relative to the support frame 3. Only one first enclosing wall 31 of the support frame 3 is provided with a first magnetic group 61, and the two second enclosing walls 32 of the support frame 3 are each provided with a second magnetic group 63. Therefore, only three sides of the support frame 3 are provided with magnetic groups. The other first enclosing wall 31 is provided with the weight 62, so as to ensure overall mass balance of the support frame 3. The anti-shake coil 51 arranged on the base 1 and corresponding to the first magnetic group 61 is configured to drive the first magnetic group 61 to drive the support frame 3 to move in a first direction (Y-axis direction). The anti-shake coils 51 corresponding to the two second magnetic groups 63 are configured to drive the two second magnetic groups 63 to drive the support frame 3 to move in a second direction (X-axis direction). In this way, optical image stabilization (OIS) is realized. The two drive coils 71 arranged on the outer side of the lens barrel 4 and respectively spaced apart from the inner sides of the two second magnetic groups 63 are configured to drive the lens barrel 4 to move in a direction (Z axis) of an optical axis, so as to realize AF. In the solution, the magnetic groups are arranged only on three sides of the support frame 3, only three anti-shake coils 51 are arranged, and only two drive coils 71 are arranged, which reduces components of the lens drive apparatus, and can ensure AF and anti-shake performance and save costs.

Further, the first magnetic group 61 includes a first magnet 611, and an N pole of the first magnet 611 faces an inner side of the support frame 3. The second magnetic groups 63 each include a second magnet 631 and a third magnet 632 fixedly stacked in a direction of an optical axis, an N pole of the second magnet 631 faces the inner side of the support frame 3, and an S pole of the third magnet 632 faces the inner side of the support frame 3. Specifically, the second magnet 631 and the third magnet 632 are rectangular blocks with a same shape, the second magnet 631 and the third magnet 632 of a same second magnetic group 63 are adhered and fixed into an integration. The second magnet 631 is located on a side of the third magnet 632 away from the base 1. The two drive coils 71 respectively correspond to positions of the two second magnetic groups 63. In this way, the second magnetic group 63 can provide the drive coil 71 with a greater driving power and better linearity to ensure AF performance. Moreover, the second magnetic group 63 is also used as a drive member of the anti-shake coil 51, which can realize anti-shake drive of the lens barrel 4 in the second direction (X-axis direction).

The magnetic circuit assembly 6 further includes a magnetically conductive ring 64 embedded side the support frame 3 and surrounding an outer side of the lens barrel 4, and the first magnet 611, the second magnet 631, and the third magnet 632 all at least partially overlap with the magnetically conductive ring 64 in a radial direction. The support frame 3 may be made of a plastic material, and the magnetically conductive ring 64 is integrally injection-molded in the support frame 3. Due to the arrangement of the magnetically conductive ring 64, the magnetic field strength of the first magnetic group 61 and the second magnetic group 63 at the inner side can be enhanced, the driving power on the drive coil 71 can be improved, and magnetic flux leakage can be reduced.

Further, an inner side of the first enclosing wall 31 is provided with a first slot 311, an inner side of the second enclosing wall 32 is provided with a second slot 321, the first slot 311 extends across the first enclosing wall 31 at a side of the support frame 3 close to the base 1, and the second slot 321 extends across the second enclosing wall 32 at the side of the support frame 3 close to the base 1. The first magnetic group 61 and the weight 62 are respectively embedded in the corresponding first slot 311, and the second magnetic groups 63 are embedded in the corresponding second slots 321. The first magnetic group 61 and the weight 62 may be respectively fixed in the first slots 311 by means of gluing. The weight 62 may be made of a metal material and have a same weight as the first magnetic group 61, so that overall mass of the support frame 3 is balanced, and the lens drive apparatus is more stable when in use. The second magnet 631 and the third magnet 632 in the second magnetic group 63 may be fixed in the second slot 321 by means of gluing. Since the first slot 311 and the second slot 321 both pass through a side of the support frame 3 close to the base 1, bottoms of the first magnetic group 61 and the second magnetic group 63 are exposed at a bottom side of the support frame 3, which is more beneficial to penetration of magnetic fields of the first magnetic group 61 and the second magnetic group 63 and improves anti-shake performance.

Further, corner positions on the top side of the base 1 are all provided with corner stoppers 11, gaps are formed between adjacent corner stoppers 11, and first winding blocks 12 are arranged in the gaps corresponding to the anti-shake coils 51. Each of the anti-shake coils 51 has a hollow central section and sleeves the corresponding first winding block 12. In the direction of the optical axis, a height of the corner stopper 11 and a height of the first winding block 12 are both greater than a height of the anti-shake coil 51. Specifically, the middle of the anti-shake coil 51 is hollow, the first winding block 12 passes through the hollow middle of the anti-shake coil 51 and abuts against an inner side of the anti-shake coil 51, and a bottom side of the anti-shake coil 51 is in contact with a bottom surface of the gap. Therefore, top surfaces of the first winding block 12 and the corner stopper 11 are higher than a top surface of the anti-shake coil 51. The base 1 is made of a plastic material. Therefore, the first winding block 12 and the corner stopper 11 can prevent directly collision of the bottom side of the support frame 3 or the bottom side of the magnetic group with the anti-shake coil 51, so as to realize protection over the anti-shake coil 51. As a result, the anti-shake coil 51 is safer and more reliable. It should be understood that the first winding block 12 may be in a shape of a strip that fills the hollow part of the anti-shake coil 51. In this way, an outer side of the first winding block 12 is in interference fit with the inner side of the anti-shake coil 51. The first winding block 12 may alternatively be a plurality of bumps, and the first and last bumps abut against two ends of an inner side wall of the anti-shake coil 51 respectively, so that the anti-shake coil 51 is stably connected to the first winding block 12. In order to further improve tightness of assembly between the first winding block 12 and the anti-shake coil 51, the first winding block 12 and the anti-shake coil 51 can also be fixed by gluing.

Further, the lens drive apparatus further includes an insert 8 embedded in the base 1, and the anti-shake coil 51 is connected to the insert 8 by spot welding. Specifically, the insert 8 is a wire routing integrally arranged in the base 1 by moulding, and part of the insert 8 protrudes from the base 1 to serve as a contact to be connected to an external circuit. Moreover, the anti-shake coil 51 is directly connected to the insert 8 by spot welding to realize electrical connection, and there is no need to arrange a flexible printed circuit board (FPC), which reduces electrically conductive parts and has a simple process and lower costs. In addition, even if the FPC is omitted, transmission performance of an anti-shake electrical signal can still be guaranteed, and a signal transmission effect is better.

Further, the lens drive apparatus further includes: an elastic connecting sheet 9 with two ends respectively fixed to the support frame 3 and the lens barrel 4, a first damping member 10 arranged between a corner position on an outer side of the lens barrel 4 and a corresponding corner position on an inner side of the support frame 3, and a second damping member (not shown) arranged between a corner position on the top side of the base 1 and a corresponding corner position on a bottom side of the support frame 3. Specifically, each of the four corner positions of the lens drive apparatus is provided with the first damping member 10 and the second damping member, and both the first damping member 10 and the second damping member may be damping glue. The first damping member 10 is arranged between an outer wall of a lens barrel and an inner wall of the support frame 3, which can realize buffer of impact on the lens in a radial direction. The second damping member is arranged between the support frame 3 and the base 1, which can realize buffer of impact on the lens in the direction of the optical axis. In this way, anti-collision performance of the lens drive apparatus can be improved, which is safer and more reliable.

Further, the outer side of the lens barrel 4 is provided with a first glue groove 41, the inner side of the support frame 3 is provided with a second glue groove 33, the extension direction of the second glue groove 33 is parallel to the optical axis, and the first damping member 10 is fixedly assembled in the first glue groove 41 and slidably assembled in the second glue groove 33. Specifically, the first glue groove 41 and the second glue groove 33 are arranged directly facing each other. The first damping member 10 is in a shape of a block. On of two ends of the first damping member 10 is fixed in the first glue groove 41, and the other of the two ends of the first damping member 10 is slidably connected in the second glue groove 33. Since the extension direction of the second glue groove 33 is parallel to the optical axis, the first damping member 10 can slide in the second glue groove 33 along the direction of the optical axis. Therefore, the displacement adjustment of the lens barrel 4 can be stably realized in the direction of the optical axis, and cushioning in a direction perpendicular to the optical axis can be realized.

Further, each of outer sides of the lens barrel 4 facing the two second magnetic groups 63 is provided with a second winding block 42 protruding from the outer side, and the drive coil 71 sleeves the corresponding second winding block 42. A side of the lens barrel 4 facing the first magnetic group 61 is provided with a wire groove 43. A lead wire 72 is connected between the two drive coils 71 and is embedded in the wire groove 43. Specifically, the second winding block 42 may include a plurality of protrusions arranged on the outer side of the lens barrel 4. In some embodiments, the second winding block 42 includes three protrusions spaced apart from each other. The three protrusions are in interference fit with an inner side of the drive coil 71, and the three protrusions and the drive coil 71 may be fixed by gluing, so that the drive coil 71 is stably assembled on the lens barrel 4. An extension direction of the wire groove 43 is a circumferential direction of the lens barrel 4. Since the lead wire 72 is embedded in the wire groove 43, two side walls of the wire groove 43 can limit the lead wire 72, thereby preventing fall-off of the lead wire 72. The lead wire 72 and the wire groove 43 may also be further fixed by gluing, so as to further improve stability of the connection between the lead wire 72 and the lens barrel 4.

The above descriptions are only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. A lens drive apparatus, comprising a base, a housing fixed to the base to form a receiving cavity, a support frame supported on a top side of the base and accommodated in the receiving cavity, a lens barrel elastically connected in the support frame, an anti-shake drive assembly arranged on the base, a magnetic circuit assembly arranged on the support frame, and a focusing drive assembly arranged on the lens barrel, wherein the support frame comprises two opposite and parallel first enclosing walls and two opposite and parallel second enclosing walls, an extension direction of the two first enclosing walls and an extension direction of the two second enclosing walls being perpendicular to each other, and the magnetic circuit assembly comprises a first magnetic group fixed to one of the two first enclosing walls, a weight fixed to the other one of the two first enclosing walls, and two second magnetic groups respectively fixed to the two second enclosing walls, wherein the anti-shake drive assembly comprises three anti-shake coils fixed to the base and respectively spaced apart from the first magnetic group and the two second magnetic groups, and wherein the focusing drive assembly comprises two drive coils fixed to an outer side of the lens barrel and respectively spaced apart from inner sides of the two second magnetic groups;

wherein the first magnetic group comprises a first magnet, an N pole of the first magnet facing an inner side of the support frame, and the two second magnetic groups each comprises a second magnet and a third magnet fixedly stacked in a direction of an optical axis an N pole of the second magnet facing the inner side of the support frame, and an S pole of the third magnet facing the inner side of the support frame;

wherein the magnetic circuit assembly further comprises a magnetically conductive ring embedded in the support frame and surrounding an outer side of the lens barrel, and the first magnet, the second magnet, and the third magnet all at least partially overlap with the magnetically conductive ring in a radial direction.

2. The lens drive apparatus according to claim 1, wherein the second magnet and the third magnet of a same second magnetic group are integrally fixedly adhered.

3. The lens drive apparatus according to claim 1, wherein an inner side of each of the two first enclosing walls is provided with a first slot, and an inner side of each of the two second enclosing walls is provided with a second slot, the first slot extending across the first enclosing wall at a side of the support frame close to the base, the second slot extending across the second enclosing wall at the side of the support frame close to the base, the first magnetic group and the weight are respectively embedded in the two first slots of the two first enclosing walls, and the second magnetic groups are respectively embedded in the two second slots of the two second enclosing walls.

4. The lens drive apparatus according to claim 1, wherein corner positions on the top side of the base are provided with corner stoppers, adjacent corner stoppers are provided with a gap therebetween, first winding blocks are arranged in the gaps corresponding to the three anti-shake coils, and the each anti-shake coil has a hollow central section and sleeves the corresponding first winding block, and in the direction of the optical axis, a height of each of the corner stoppers and a height of each of the first winding blocks are both greater than a height of each of the three anti-shake coils.

5. The lens drive apparatus according to claim 4, further comprising an insert embedded in the base, wherein each of the anti-shake coils is connected to the insert by spot welding.

6. The lens drive apparatus according to claim 1, further comprising: an elastic connecting sheet with two ends respectively fixed to the support frame and the lens barrel; a first damping member arranged between a corner position on an outer side of the lens barrel and a corresponding corner position on an inner side of the support frame; and a second damping member arranged between a corner position on the top side of the base and a corresponding corner position on a bottom side of the support frame.

7. The lens drive apparatus according to claim 6, wherein the outer side of the lens barrel is provided with a first glue groove, the inner side of the support frame is provided with a second glue groove whose extension direction is parallel to an optical axis, and the first damping member is fixedly assembled in the first glue groove and slidably assembled in the second glue groove.

8. The lens drive apparatus according to claim 1, wherein outer sides of the lens barrel facing the two second magnetic groups are each provided with a second winding block protruding the corresponding outer side, and each of the drive coils sleeves the corresponding second winding block, and wherein a side of the lens barrel facing the first magnetic group is provided with a wire groove, and the two drive coils are connected by a lead wire embedded in the wire groove.

* * * * *